Sept. 17, 1968   G. M. JOSEPHSON   3,402,016
FUSED SODIUM CHLORIDE FLAKES
Filed Aug. 25, 1966   3 Sheets-Sheet 1
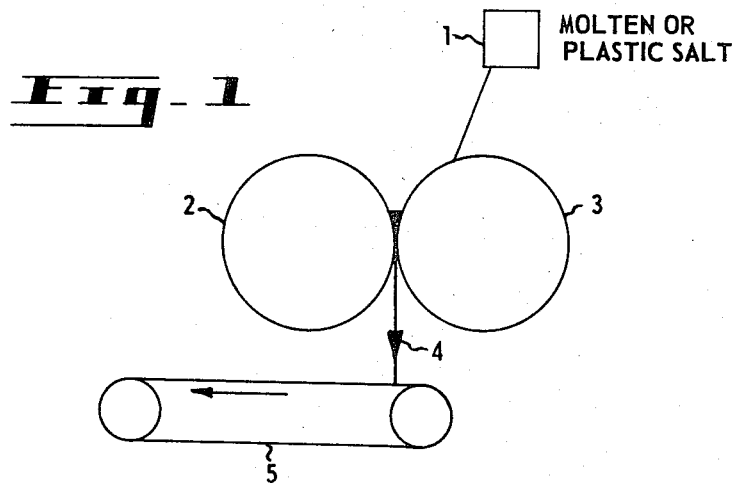
Fig. 1
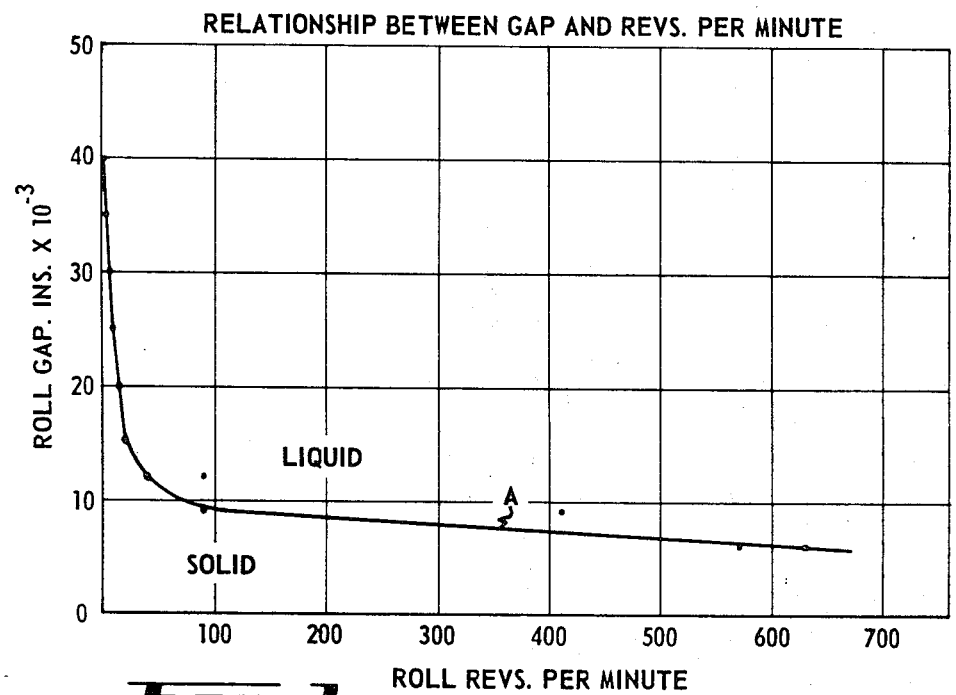
Fig. 2
INVENTOR
Gilbert M. JOSEPHSON
PATENT AGENT Sept. 17, 1968  G. M. JOSEPHSON  3,402,016
FUSED SODIUM CHLORIDE FLAKES
Filed Aug. 25, 1966  3 Sheets-Sheet 3
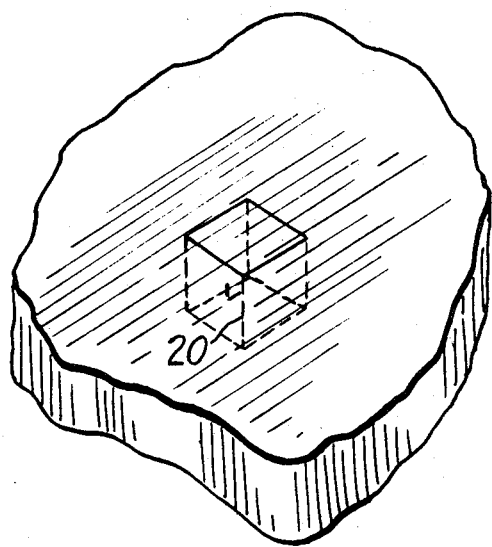
FIG. 4
INVENTOR
Gilbert M. JOSEPHSON
PATENT AGENT United States Patent Office 3,402,016
Patented Sept. 17, 1968

3,402,016
FUSED SODIUM CHLORIDE FLAKES
Gilbert Martin Josephson, Westmount, Quebec, Canada, assignor to Domtar Limited, Montreal, Quebec, Canada, a Canadian company
Continuation-in-part of application Ser. No. 303,102, Aug. 19, 1963. This application Aug. 25, 1966, Ser. No. 575,158
Claims priority, application Great Britain, Aug. 29, 1962, 33,093/62
6 Claims. (Cl. 23—89)

ABSTRACT OF THE DISCLOSURE

The present invention relates to forming molten sodium chloride into thin flakes by solidifying same in contact with the surfaces of a pair of nip forming rolls, to form a pair of films of solid salt separated by a molten layer, and solidifying said molten layer after the salt leaves the nip. The present invention also relates to a fused salt flake, formed by the above described method.

---

This application is a continuation-in-part of U.S. application 303,102, filed Aug. 19, 1963, now abandoned.

The present invention relates to salt flakes, more particularly to sodium chloride flakes of uniform thickness and to a method of producing such uniform flakes.

There are many prior proposals relating to flake salts and to substitute for such flake salts, however, there are few commercial processes for producing such flake salts. One commercial process is an evaporation process and consists in evaporating brine thereby to precipitate salt crystals and form salt flakes of a specific type. Flakes produced by this method consist of individual salt crystals precipitated into aggregates of random shapes and sizes. With this type of salt, the dissolving rate is substantially the same regardless of the mesh size and therefore no means for control of dissolving rate is provided.

Another form of flake salt is taught in U.S. Patent No. 2,018,633 to Boller. This patent discloses a method of making salt flakes by forming a mixture of salt and adhesive into a film on a heated roll, driving off the adhesive solvent and binding the salt crystals together by means of such adhesive. The resultant product consists of a plurality of discrete salt particles or crystals bound together by adhesive and therefore having a relatively rough surface and proper uniformity of thickness cannot be obtained. Furthermore, the product always contains impurities and cannot be used where high purity is required.

In another patent, namely U.S. Patent No. 2,432,915 to Grant-Mackay, there is disclosed a substitute for flake salts which substitute is formed by spraying molten sodium chloride into a pool of sodium chloride brine, thereby to solidify the molten sodium chloride into substantially spherical globules of salt. Such globular salt products do not have the uniform thickness required for proper control of the dissolving rate and therefore are unsatisfactory for applicant's purpose.

Salt flakes may also be produced by compaction but, flakes of the uniform thickness required cannot be made primarily because of the high pressures necessary in forming the flakes. Compacted flakes are structurally weak and are easily degraded by size reduction, which results in alteration of the solution rate of the product and the product acquiring caking and dusting characteristics. It is thus a further object of the present invention to provide a uniform thickness fused flake that is not easily degraded.

For many applications it is desirable to have salt with a specific dissolving rate matched to the process in which it is to be used. For example, in the manufacture of cheddar cheese, various processes are used and the salt should be tailored to the specific process. Too slow a solution rate may result in excessive salt content in the cheese and delaying of ripening. On the other hand, too fast a solution rate may result in excessive loss of salt from the cheese when the whey and water drains from the wet curd to cause abnormal ripening and the formation of a cheese of weak body and open texture. It is thus one of the main objects of the present invention to provide a salt product having a selected dissolving rate.

In the manufacture of free running salt products it is the practice to use non-caking additives which provide the free flowing characteristics. With salt flakes of the present invention, a free flowing salt can be obtained without the use of additives by producing flakes whose thickness dimension is small relative to the other dimensions. It is thus a further object of the present invention to provide a free flowing salt product without the use of additives.

Applicant has found that salt flakes having substantially smooth surfaces and being of substantially uniform thickness are characterized by a substantially constant dissolving rate for a given thickness and by a dissolving rate that decreases as the thickness increases. By a substantially smooth surface it is meant one which exhibits a glazed or vitreous appearance so that the individual crystals are not readily apparent to the naked eye. This may be contrasted with commercially available flake salts which are formed by adhesion of discrete particles or crystals which are readily apparent to the eye and provide a rough surface on the salt flake.

To produce salt flakes of the requisite characteristics, applicant has found that it is necessary to solidify molten salt while in contact with a pair of opposed surfaces thereby to impart a smooth surface to said flake, the spacing between said smooth cooling surfaces governing the resultant thickness of the flake it being important that the total thickness of the flake not become solid before the flake leaves the cooling surfaces.

Having broadly described the flakes of the present invention and the method of making same, a further detailed description in conjunction with the accompanying drawings follows. In the drawings:

FIG. 1 is a schematic illustration of the process of the present invention.

FIG. 2 is a curve illustrating the preferred mode of operation.

FIG. 4 is an illustration of the relationship of one form of crystal relative to the surface of the flake.

Figure 3:
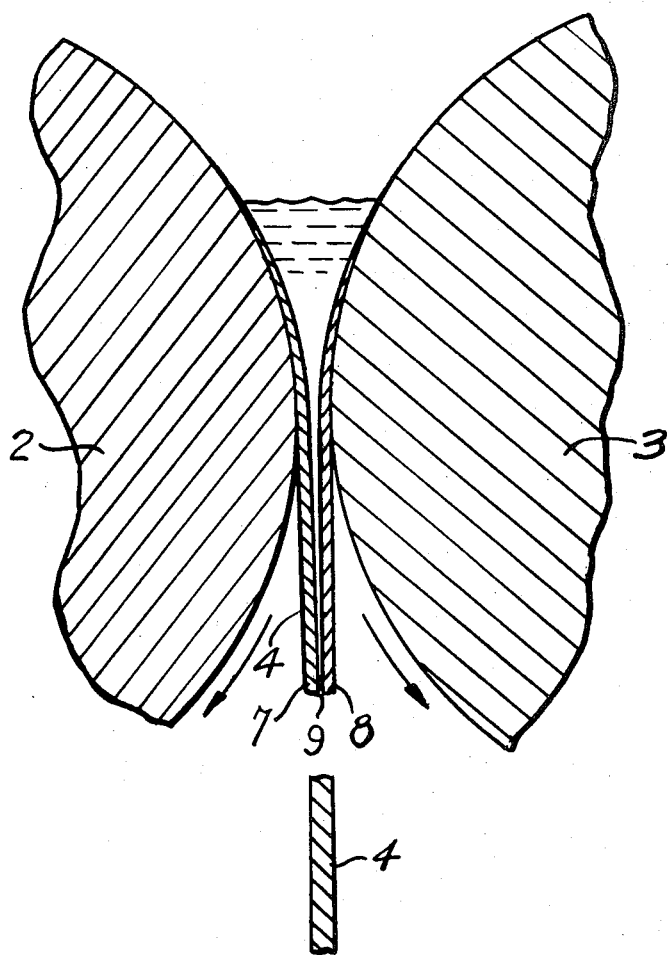
FIG. 3 is an enlarged sectional view schematically illustrating the formation of the sheet of flake salt.

In the illustrated embodiment, molten salt from crucible 1 is fed unto a pair of rolls 2 and 3. The salt flows into and floods the nip between these two rolls and leaves the rolls as a uniform thickness sheet 4. This sheet 4 of salt falls onto and breaks up into flakes upon striking the conveyor 5. The flakes so formed may be further broken up as required by additional equipment not shown.

To form the salt sheet 4, molten salt solidifies in contact with the surfaces of the rolls 2 and 3 and forms a pair of films 7 and 8 of solid salt enclosing sandwich-like a layer 9 of salt in liquid form substantially as indicated in FIG. 3. The thickness of these two films must be controlled to ensure that the layer 9 does not disappear before the salt sheet 4 leaves the nip between the rolls 2 and 3 and that these films are sufficiently thick to contain the layer 9 and prevent spattering when the sheet hits the conveyor 5. If the layer 9 disappears too soon only solid salt will traverse the nip and this will require crushing of the solid salt which in turn necessitates the use of much more rugged rolls and much higher horse power and results in a product that does not have the characteristics required to obtain the advantages of the present invention. The sheet must be sufficiently solid to prevent the layer 9 from spattering and sticking adjacent flakes together when the sheet is broken up as it hits the conveyor 5. The speed of the conveyor is faster than that of the sheet 4 to prevent piling up of flakes on the conveyor.

The speed of the rolls 2 and 3 is faster than that of the sheet 4 and therefore there is a relative movement between the solid films 7 and 8 and the rolls which reduces any tendency for the sheet 4 to stick to the rolls.

The thickness of sheet 4 and thus of the resultant flakes may be controlled by varying the gap or spacing at the nip between the rolls 2 and 3 within specified limits.

For accurate control of flake thickness applicant has found that there is an optimum roll speed for any given nip size. In FIG. 2 a plot of roll gap against roll speed for a Blaw-Knox laboratory atmospheric double drum dryer of 6 in. diameter and 7⅝ in. in length made of plated cast iron has been plotted. To carry out these experiments sodium chloride was heated to 1515° F. in a small furnace and small quantities of the molten sodium chloride were hand ladled unto the rolls.

When operating in conditions above the curve A of FIG. 2 the sheet 4 leaving the rolls is substantially in the liquid phase and spatters when contacting the conveyor 5. By maintaining the roll gap and roll speed with coordinates below curve A, salt sheets will be formed that are solid and will not spatter. Optimum operating conditions are such that the roll gap and roll speed should be set to operate close to the curve A. For this reason, on any new installation, a curve such as that illustrated in FIG. 2 should be plotted and operation be controlled in accordance with this curve.

In operation the nip between the rolls should be maintained slightly flooded.

With proper control of the roll gap and speed, flakes ranging in thickness from approximately 0.001 to 0.04 inch may selectively be produced. When the upper limit of this range is exceeded it is substantially impossible to produce flakes according to the present invention since the molten salt simply slides right through the nip as a liquid. If flakes of thickness greater than the said 0.4 inch are contemplated, apparatus other than that described hereinabove must be utilized. Preferably the flake thickness will be in the range of about 0.003 inch to about 0.03 inch.

The salt flakes of the instant invention produced in the manner described hereinabove have essentially smooth surfaces exhibiting a vitreous appearance with no definite crystalline structure being apparent and are of very uniform thickness. To compare commercially available flake salts produced by the evaporation process with the instant invention, tests were conducted on the solubility showing both average rates of solubility and uniformity of solubility as indicated by the maximum deviation from average. These results are tabulated in Tables 1 and 2.

It may be seen by comparing Tables 1 and 2 that the maximum deviation from average solubility with flakes of the present invention is much lower than with commercially available salt products. This is primarily due to the smooth surface and uniform thickness of the flakes of the present invention. Referring to the last column of Tables 1 and 2 it is apparent that there is a wide difference in uniformity. The product of the present invention shows a maximum deviation of about 8% compared with the 74% deviation of the commercial product.

The commercial flake products are of random thickness and are of irregular shape and can only be sized by passing through suitable screening means. Applicant's salt flakes are of uniform thickness and thus may be sized by two criterion, namely mesh size and thickness. Provided the mesh size is larger than the thickness of applicant's flakes, the solubility is determined by the thickness and therefore will always be uniform when utilizing the uniform thickness flakes of the present invention.

An added advantage of applicant's flake salt is the change in solubility rate as the thickness increases. It will be noted that there is very little change in solubility rate of the commercial product as the mesh is changed. As shown in Table 2 an average mesh size of approximately 0.4 inch has a solubility rate of 14 seconds, while a mesh size of 0.004 inch has a solubility rate of 3.4 seconds, i.e., a total change of about 10 seconds. This may be compared with the present invention wherein the solubility changes from about 8.6 seconds to 104.5 seconds or a total of about 96 seconds for a similar change in thickness. These changes in solubility rates of applicant's products permits the tailor-making of salt flake products with specific solubility rates for any given mesh size. For example, by crushing flakes of .004 in. thickness and screening same to an average screen size of say 0.04 inch, applicant can provide a flake product having a solubility of about 8.6 seconds and a mesh size of 0.04 inch. Similarly, if these 0.004 in. thick flakes are screened to an average screen size of say 0.007 inch, applicant may provide a flake having a solubility of the same 8.6 seconds and a mesh size of 0.007 inch. In this manner applicant provides a product that permits choosing the solubility rate for a specified mesh size, provided, of course, that this mesh size is larger than the flake thickness required for that solubility rate.

Thus, applicant has disclosed a novel sheet or flake salt of more uniform thickness, which flake permits accurate selection of solubility rate for a given mesh size and has provided a method of producing such flakes.

The product of the present invention also exhibited non-caking characteristics when crushed to a mesh size to substantially larger than the thickness of the flake. Also the flakes of the present invention do not break down easily so that the size of flakes is not substantially reduced by normal handling. It is believed that the strength of the flakes is probably due to crystal orientation since applicant's flakes have the crystals orientated in substantially one direction rather than randomly as with compacted salt. One of the cubic axes of the crystallites of applicant's product generally lies perpendicular to the plane of the flake in FIG. 4 a salt crystal which, in this example, has been shown as a cubic crystal has one cubic axis designated 20 which is perpendicular to the surface of the flake.

TABLE 1.—FLAKES OF THE PRESENT INVENTION

| Number of Samples | Thickness, Inches×10⁻³ | Solubility | | |
|---|---|---|---|---|
| | | Average Time, Sec. | Max. Deviation from Average Time | |
| | | | Sec. | Percent |
| 5 | 4 | 8.6 | 0.6 | 7 |
| 4 | 8 | 15.75 | 1.25 | 8 |
| 5 | 9 | 16 | 0 | 0 |
| 4 | 10 | 16.5 | 0.5 | 3.1 |
| 6 | 11 | 20 | 1.0 | 5 |
| 3 | 12 | 23 | 0 | 0 |
| 3 | 19 | 34.7 | 2.3 | 6.6 |
| 4 | 38 | 104.5 | 4.5 | 4.3 |

TABLE 2.—COMMERCIAL PRODUCTS—FLAKES EVAPORATED

| Number of Samples | Screen Size, In.×10⁻³ | | Solubility | | |
|---|---|---|---|---|---|
| | Below | On | Average Time, Sec. | Max. Deviation from Average Time | |
| | | | | Sec. | Percent |
| 4 | 46 | 32.8 | 39.4 | 14.0 | 3.0 | 21 |
| 5 | 32.8 | 23.2 | 28 | 8 | 3 | 37.5 |
| 5 | 23.2 | 16.4 | 19.8 | 7.2 | 1.8 | 25 |
| 5 | 16.4 | 11.6 | 14 | 9.4 | 3.6 | 38.3 |
| 4 | 11.6 | 8.2 | 9.9 | 4.7 | 2.2 | 46.7 |
| 5 | 8.2 | 5.8 | 7 | 4.6 | 3.4 | 74 |
| 5 | 5.8 | -------- | 4 | 3.4 | 1.6 | 47 |

I claim:

1. An essentially uniform thickness free flowing flake of fused sodium chloride, said thickness being in the range of 0.001 to 0.04 inch, characterized by; a pair of opposite essentially smooth and parallel surfaces on said flake, said surfaces being spaced by said thickness, said surfaces having a vitreous appearance, further characterized by said flake comprising crystals of sodium chloride oriented in substantially one direction relative to the said surfaces of said flake.

2. An essentially uniform thickness flake as defined in claim 1 wherein said crystals are orientated to lie with one cubic axis of said crystals perpendicular to said surfaces.

3. An essentially uniform thickness flake as defined in claim 1 having a thickness in the range of 0.003 to 0.03 inch.

4. A method of forming fused flakes of sodium chloride comprising; heating sodium chloride to form molten sodium chloride, shaping said molten sodium chloride between a pair of opposed surfaces to form a sheet, cooling said molten sodium chloride in contact with said surfaces to form films of solidified sodium chloride in contact with said opposed surfaces, maintaining a layer of molten sodium chloride between said films until said surfaces have completed forming of said sheet, further cooling said sheet to solidify said molten layer and breaking up said sheet thereby to form sodium chloride flakes of essentially uniform thickness in the range of 0.001 to 0.04 inch.

5. A method as defined in claim 4 further including moving said opposed surfaces in the same direction as said films but at a faster speed than said films.

6. A method as defined in claim 4 further including moving said opposed surfaces in the same direction as said films but at a faster speed than said films and wherein said surfaces are formed by a pair of nip forming rolls.

References Cited
UNITED STATES PATENTS 2,018,633 10/1935 Boller _____ 23—89
2,432,915 12/1947 Grant-Mackay _____ 23—293

OSCAR R. VERTIZ, *Primary Examiner.*

EDWARD STERN, *Assistant Examiner.*